(12) United States Patent
Hudson et al.

(10) Patent No.: US 9,081,162 B2
(45) Date of Patent: Jul. 14, 2015

(54) RUGGED MICROMODULE CABLE

(71) Applicant: Corning Cable Systems LLC, Hickory, NC (US)

(72) Inventors: H. Edward Hudson, Conover, NC (US); William Carl Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 28 days.

(21) Appl. No.: 14/107,512

(22) Filed: Dec. 16, 2013

(65) Prior Publication Data

US 2015/0168660 A1 Jun. 18, 2015

(51) Int. Cl.
*G02B 6/44* (2006.01)
*B32B 37/15* (2006.01)
*B32B 38/00* (2006.01)

(52) U.S. Cl.
CPC .............. *G02B 6/443* (2013.01); *B32B 37/153* (2013.01); *B32B 38/0012* (2013.01); *G02B 6/4486* (2013.01); *G02B 6/4489* (2013.01); *B32B 2305/10* (2013.01); *B32B 2307/40* (2013.01); *B32B 2309/105* (2013.01); *B32B 2551/00* (2013.01)

(58) Field of Classification Search
None
See application file for complete search history.

(56) References Cited

U.S. PATENT DOCUMENTS

| | | | | |
|---|---|---|---|---|
| 4,515,435 A | | 5/1985 | Anderson | 350/96.23 |
| 4,688,888 A | * | 8/1987 | Kimmich | 385/113 |
| 5,355,427 A | * | 10/1994 | Gareis et al. | 385/103 |
| 8,582,942 B1 | * | 11/2013 | Burnett | 385/113 |
| 8,798,417 B2 | * | 8/2014 | Blazer et al. | 385/112 |
| 8,913,862 B1 | * | 12/2014 | Emmerich et al. | 385/103 |
| 2011/0211793 A1 | * | 9/2011 | Barrett et al. | 385/104 |
| 2012/0243841 A1 | * | 9/2012 | Hurley et al. | 385/113 |
| 2013/0287346 A1 | * | 10/2013 | Gimblet et al. | 385/100 |
| 2014/0023331 A1 | * | 1/2014 | Lim et al. | 385/113 |
| 2014/0140669 A1 | * | 5/2014 | Islam | 385/100 |

FOREIGN PATENT DOCUMENTS

| | | | |
|---|---|---|---|
| CN | 101840044 A | 9/2010 | G02B 6/44 |
| CN | 102331610 A | 1/2012 | G02B 6/44 |
| CN | 202383331 U | 8/2012 | G02B 6/44 |
| CN | 202421578 U | 9/2012 | G02B 6/44 |
| JP | 2000-321472 A | 11/2000 | G02B 6/44 |

* cited by examiner

*Primary Examiner* — Sung Pak
(74) *Attorney, Agent, or Firm* — William D. Doyle

(57) ABSTRACT

A rugged micromodule cable includes central strength yarns, micromodules stranded around the central strength yarns, additional strength yarns positioned around the stranded micromodules, and a jacket of polymeric material surrounding the additional strength yarns. The micromodules each include sheathing surrounding a plurality of optical fibers. The strand profile of the micromodules is tight, having an average lay length of less than 250 mm, and the sheathing is thin-walled, having an average thickness of less than about 200 micrometers. The strand of the micromodules, the positioning of the additional strength yarns, and bonding between the additional strength yarns and the jacket mitigate lengthwise movement of the optical fibers in the rugged micromodule cable.

20 Claims, 3 Drawing Sheets

RUGGED MICROMODULE CABLE

BACKGROUND

Aspects of the present disclosure relate generally to fiber optic cables, and more specifically to rugged fiber optic cables supporting micromodules.

Micromodules typically include thin-walled tubular sheaths that contain sets of optical fibers. Micromodule cables are fiber optic cables that typically contain a plurality of such micromodules within an overall cable jacket. Such cables may be used in controlled indoor environments, such as in datacenters, and are particularly easy to work with because the optical fibers within the micromodule sheaths tend to be highly accessible. For example, often the sheaths are designed to be torn open with the bare fingers of a technician. Loose placement of the sheathing around the optical fibers in the micromodules, loose placement of the micromodules within the overall cable jacket, and loose placement of other components within the jacket may facilitate flexibility of the micromodule cable and ease of access to contents of the micromodules, which may be well suited for the indoor environment.

However, some of these same attributes of micromodule cables that are beneficial in a controlled indoor environment, such as a datacenter, may prove to be detrimental to operating with a micromodule cable in more rugged environments. Fiber optic cables designed for rough environments, such as to be pulled through sewer channels, along roadways, or over rocky terrain, may include layers of metal armor and the optical fibers may be stored in durable, yet relatively inflexible, plastic buffer tubes. Such cables are well suited to handle challenging environments, but may not be convenient for operators and technicians to open and work with the optical fibers therein. Optical fibers in conventional micromodule cables placed in such challenging environments may move around, such as being drawn lengthwise through the cable, and may be more susceptible to pulling out of connectors or assemblies to which they are attached. A need exists for a fiber optic cable that combines the ease of access and handling of a conventional micromodule cable with the toughness and durability of a more rugged cable.

SUMMARY

One embodiment relates to a method of manufacturing a rugged micromodule cable, which includes several steps. One step includes stranding micromodules around one or more central strength yarns. The micromodules each include sheathing surrounding a plurality of optical fibers and the central strength yarns include fibrous strength material. Another step includes positioning additional strength yarns around the stranded micromodules. Yet another step includes extruding a jacket of polymeric material over the additional strength yarns. The extruding is such that at least some of the additional strength yarns bond to an interior surface of the jacket. The steps of stranding the micromodules, positioning the additional strength yarns, and bonding the jacket and additional strength yarns together mitigate lengthwise movement of the optical fibers in the rugged micromodule cable.

Another embodiment relates to a rugged micromodule cable, which includes central strength yarns, micromodules stranded around the central strength yarns, additional strength yarns positioned around the stranded micromodules, and a jacket of polymeric material surrounding the additional strength yarns. The micromodules each include sheathing surrounding a plurality of optical fibers. The strand profile of the micromodules is tight, having an average lay length of less than 250 mm, and the sheathing is thin-walled, having an average thickness of less than about 200 micrometers. The strand of the micromodules, the positioning of the additional strength yarns, and bonding between the additional strength yarns and the jacket mitigate lengthwise movement of the optical fibers in the rugged micromodule cable.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
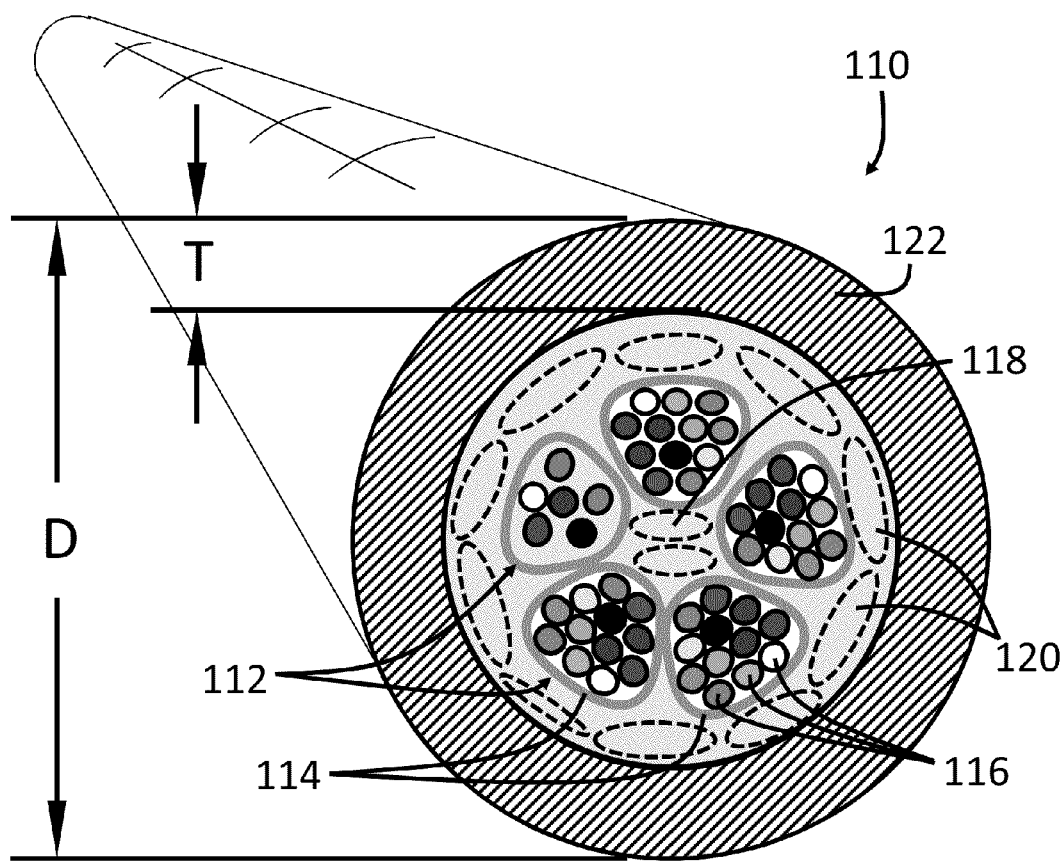
FIG. 1 is a cross-sectional view of a fiber optic cable according to an exemplary embodiment.

Referring to FIG. 1, a fiber optic cable, in the form of a micromodule cable 110, includes one or more micromodules 112 in a jacket 122. The micromodules 112 include sheathing 114 or a tube that forms a conduit through which extend one or more optical fibers 116. According to an exemplary embodiment, the micromodule cable 110 further includes strength members, such as fibrous strength yarns 118, 120, such as aramid, fiberglass, or other fibrous strength material. In some embodiments, the micromodules are stranded around centrally-placed strength yarns 118. Around the exterior of the micromodules 112, the micromodule cable may further include the additional strength yarns 120. The strength yarns 118, 120 in FIG. 1 are shown with dashed lines to indicate their approximate locations, however the strength yarns 118, 120 may be more broadly interspersed throughout the interior of the jacket 122, such as filling interstices between micromodules 112. In some embodiments, the strength yarns 120 are placed adjacent to the jacket 122 and these strength yarns may be coated with an adhesive agent or promoter, such that the strength yarns 120 bond to the jacket 122.

According to an exemplary embodiment, the sheathing 114 of the micromodules 112 is particularly thin-walled, such as 300 micrometers or less on average, 200 micrometers or less, or even about 100 micrometers (e.g., 100 micrometers±50 micrometers). In some embodiments, the micromodules 112 are particularly narrow, having an outer "diameter" of less than about 1.6 mm, such as less than 1.5 mm, or about 1.4 mm (e.g., 1.4 mm±100 micrometers, such as ±50 micrometers). Diameter is in quotation marks to denote that the micromodules 112 may not be round in cross-section, especially when compressed into the micromodule cable 110. Instead the parameter "diameter" is intended to be an average cross-sectional dimension passing from the exterior, through the center, and to the opposite exterior of the micromodule 112. In some embodiments, the sheath 114 is formed from a polymeric material, such as a high-filled polymer, such as including up to about 80% talc-filled polyvinyl chloride by weight, or another material.

According to an exemplary embodiment, the material of the sheath 114 is specially formulated to have low elongation and a high coefficient of friction. The low elongation aids in tool-less removal of the sheath 114 and the high coefficient of friction aids in coupling the optical fibers 116 to the strength yarns 118, 120. In some such embodiments, the sheath 114 that may be removed from the optical fibers 116 with bare fingers, without damaging coatings of the optical fibers 116. Specialty ring cutters and other devices may be unnecessary to open the micromodules 112, mitigating risks of scratching or otherwise damaging the optical fibers 116.

In some embodiments, the sheath 114 of different micromodules 112 of the micromodule cable 110 are colored differently from one another to facilitate easy identification of individual groups of optical fibers 116 contained therein. In some embodiments, the different colors greatly contrast one another, such as two of the micromodules 112 having colors with a difference in Munsell value, chroma, and/or hue of at least 3, such as at least 5.

In some embodiments, the micromodules 112 are formed primarily of the optical fibers 116 and the sheathing 114, with no additional elements other than possibly some water-swellable powder. In some such embodiments, the optical fibers 116 include at least 2, such as at least 4, such as least 6 optical fibers 116 per micromodule 112. In some embodiments, the optical fibers 116 consist of only 12 optical fibers per micromodule 112 for at least two of the micromodules 112 of the micromodule cable 110. According to an exemplary embodiment, the micromodule cable 110 may include different arrangements of micromodules 112, such as some micromodules 112 with twelve fibers 116 and another micromodule 112 with a lesser number of optical fibers 116, such as six or less, as shown in FIG. 1. In some embodiments, the micromodules 112 may be lined with water-swellable powder for water-blocking. In other embodiments, the micromodules include yarns that may carry water-blocking powder, but are not configured to provide additional strength the micromodule 112.

In some embodiments, the micromodules 112 additionally include strength yarn (see, e.g., strength yarn 118, 120) or other elements in addition to the optical fibers 116 within the sheath 114. For example, in some embodiments, the micromodules 112 may include aramid yarn inside the sheath 114 with additional strength yarn 118, 120 outside of the sheath and within the jacket 122. Some of the micromodules 112 in the micromodule cable 110 may contain strength yarns while others in the same micromodule cable 110 may not. For example, a six-fiber micromodule 112 may contain strength yarns to supplement the contents of the six-fiber micromodule 112 so that the six-fiber micromodule 112 has about the same size as other twelve-fiber micromodules 112 with which the six-fiber micromodule 112 is stranded (see generally FIG. 1).

According to an exemplary embodiment, the micromodules 112 are stranded (e.g., wound, wrapped, twisted together) around a central element, such as a central strength member or central strength yarn. In FIG. 1, the central element is formed from one or more strength yarns 118, as opposed to a rigid rod. In some such embodiments, the strength yarn 118 is aramid, such as two or more individual yarns of aramid (e.g., four yarns of about 2450 denier). Flexibility of the central strength yarns 118 allows the micromodule cable 110 to bend and flex, as may be convenient for operations in a confined environment, such as narrow trenches having sharp turns. In other contemplated embodiments, such as where flexibility is less important, conventional rigid rod strength members may be used for the central element, such as a glass-reinforced plastic (GRP) central strength member.

According to an exemplary embodiment, the micromodules 112 are stranded around the central element in a tight lay. In some embodiments, the average lay length of the strand is 300 mm or less, such as 250 mm or less, or even about 200 mm or less (e.g., 160 mm±50 mm). Lay length is the lengthwise distance along the central axis of the strand for the stranded element to complete one full rotation about the central axis. This value can be extrapolated from less than full rotations. For example, for some stranding patterns this length is determined by taking an average number of turns between reversals in the stranding direction divided by the lengthwise distance between the reversals. A fair way to calculate the lay length of a cable is to take an average of the value over a relatively long length of the cable, such as 50 meters.

The stranding profile of the micromodule cable 110 disclosed herein may be "SZ" stranded, helical stranded, or may include other stranding patterns, or the stranding profile may be random and/or not follow a repeating pattern. Stranding of the micromodules 112 is intended to promote coupling between the micromodules 112 and the central element, between the micromodules 112 with others of the micromodules 112, and with the corresponding optical fibers 116 of the micromodules 112 and the other cable components. The coupling limits undesired fiber movement, such as movement that may otherwise occur if the cable jacket 122 expands or contracts due to changes in temperature of the surrounding environment.

According to an exemplary embodiment, the micromodule cable 110 further includes a layer of strength yarn 120 exterior to the stranded micromodules 112 and interior to the jacket 122. The strength yarns 120 may be the same type of material used for the central element, such as aramid yarns (e.g., twelve 2450 denier yarns). In some embodiments, the amount of strength yarns 120 exterior to the central element is at least twice that as the amount forming the central element, such as at least three times, or even about four times (e.g., 4±0.33 times). Use of a thick layer of the strength yarns 120 provides cushioning material for the micromodules 112 as well as tensile strength to the micromodule cable 110.

In some embodiments the strength yarns 120 are stranded around the stranded micromodules 112 and may serve as a binder holding the stranded micromodules 112 prior to extrusion of the jacket 122. In some such embodiments the strength yarns 120 are counter-helically wrapped around the stranded micromodules 112, meaning that some are wrapped one way while others are wrapped the other way and overlap one another. The lay length of the strength yarns 120 may be different than that of the micromodules 112, such as greater than the lay length of the micromodules 112, such as at least twice as great as the lay length of the micromodules 112 on average. In still other embodiments, the strength yarns 120 may not be stranded, and may extend generally in parallel with the central axis of the micromodule cable 110.

According to an exemplary embodiment, the jacket 122 of the micromodule cable 110 is tightly drawn onto the strength yarns 120. In some embodiments, the jacket 122 is formed from a polymeric material, such as a particularly tough material, such as primarily consisting of polyurethane by weight. In some such embodiments, the micromodule cable 110 is well suited for harsh environments such as sandy and rocky soil. In some embodiments, the average thickness T of the jacket is about 1.25 mm or less, such as about 1 mm (±150 micrometers). With the jacket 122 tightly drawn onto the strength yarn 120, the micromodule cable 110 is compact, having an outer diameter D of less than 10 mm, such as less than 8 mm, such as about 7 mm (e.g., 7 mm±500 micrometers).

Figure 2:
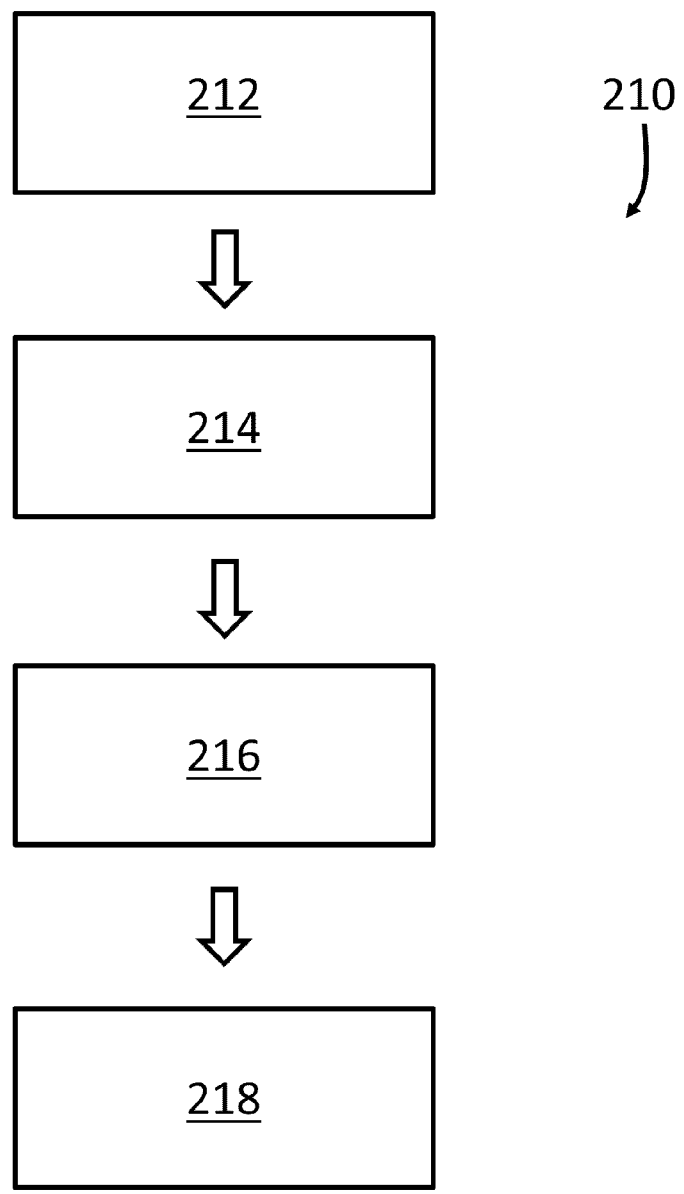
FIG. 2 is a flow chart of a method of manufacturing the fiber optic cable of FIG. 1 according to an exemplary embodiment.

Referring to FIG. 2, the micromodule cable 110 of FIG. 1 may be manufactured by a process 210 including several steps. One step 212 includes stranding a plurality of the micromodules 112, as described above. Another step 214 includes positioning strength yarn 120 around the stranded micromodules 112, as described above. In some embodiments, at least some of the strength yarns 120 are positioned generally in parallel with the lengthwise axis of the cable. Yet another step 216 includes extruding the jacket 122 over the strength yarn 120. According to an exemplary embodiment, the extruding of the step 216 is done by pressure extrusion, which compresses the interior contents of the micromodule cable 110 via radial inward force at the extruder. Indicia of the pressure extrusion may include grooves on the interior of the jacket 122 formed by the impression of the strength yarns 120 during extrusion.

Another step 218 includes cooling the jacket, which contracts, providing still more radial inward force to tightly hold the strength yarns and micromodules in place. In some embodiments, the micromodule cable 110 is compact, being tightly filled such that the strength yarns 118, 120 are actually compressed therein and under inward radial pressure due to tension of the jacket 122. As such, the interior cavity defined by the jacket 122 may have less than 10% free space voids filled only by air, such as less than 5% free space. The high cable density and the cushioning of the strength yarn 120 provides for a cable particular well suited for performance under crush loading. Accordingly, the optical fibers 116, the strength yarns 118, 120, and the jacket 122 of the micromodule cable 110 are well coupled to one another by being pressed against one another, thereby reducing or eliminating movement of the optical fibers 116 and providing a rugged micromodule cable 110.

Figure 3:
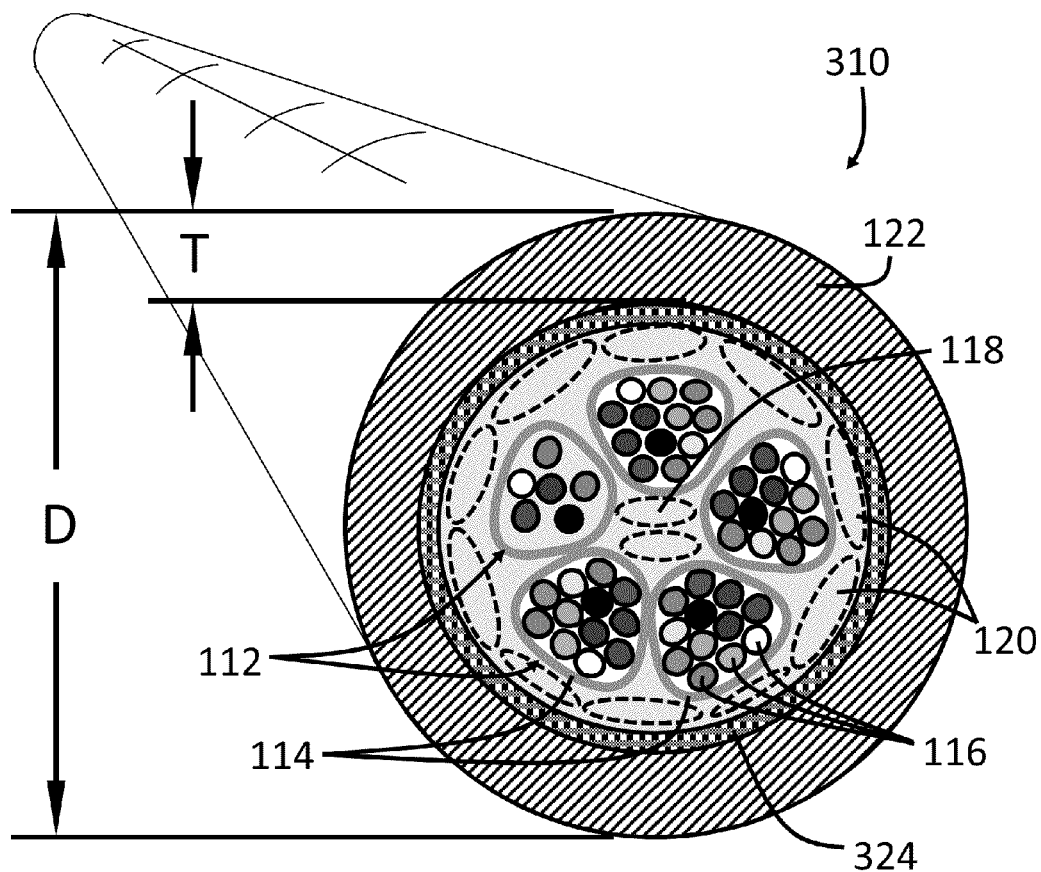
FIG. 3 is a cross-sectional view of a fiber optic cable according to another exemplary embodiment.

Referring now to FIG. 3, a fiber optic cable 310 may be manufactured according to the above process 210, but with other forms of bonding between the strength members 120 and the jacket 122. For example, in some embodiments, the fiber optic cable 310 includes strength yarn 120 (e.g., aramid, fiberglass) bundled or coated in a matrix containing a material that bonds to the jacket 122, such as during the manufacturing process 210 when the jacket 122 is hot from extrusion. The coating or matrix of the strength yarn 120 may include material of the jacket. In some such embodiments, the jacket 122 includes polyurethane and the coating or matrix of the strength yarn 120 also includes polyurethane such that when the jacket 122 is extruded onto the strength yarn 120, the polyurethane of the jacket 122 partially melts and bonds with the polyurethane of the coating or matrix, thereby bonding the strength yarn 120 and jacket 122 to one another and providing cohesion and strength to the fiber optic cable 310. In other embodiments, the bonding agent is an adhesive or adhesive promoter.

Still referring to FIG. 3, according to an exemplary embodiment the fiber optic cable 310 includes a layer of the strength yarns 324 in addition to the strength yarns 120. In some embodiments, the strength yarns 324 are a different material than the strength yarns 120, such as fiberglass for one and aramid for the other. In some embodiments, the strength yarns 324 are arranged differently than the strength yarns 120, such as aligned with the lengthwise axis of the fiber optic cable 310 (i.e., unstranded) for one and stranded (e.g., SZ stranded, helically stranded) for the other as described above with the embodiments of FIGS. 1-2. In some embodiments, the strength yarns 324 are fiberglass strength yarns that are unstranded and are coated in a matrix that includes polyurethane that bonds with polyurethane of the jacket during extrusion of the jacket. In some embodiments, use of bonding between the strength yarns 324 and/or 120 and the jacket 122 may be used in conjunction with or in place of pressure extrusion. In some embodiments, the step 216 of FIG. 2 includes bonding of the strength yarn 324 and/or 120 and the jacket 122.

The construction and arrangements of the fiber optic cables, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A method of manufacturing a rugged micromodule cable, comprising steps of:

stranding micromodules around one or more central strength yarns, wherein the central strength yarns comprise fibrous strength material, wherein the micromodules each comprise sheathing surrounding a plurality of optical fibers, and wherein the sheathing is thin-walled, having an average thickness of less than about 200 micrometers;

positioning additional strength yarns around the stranded micromodules; and pressure extruding a jacket of polymeric material over the additional strength yarns such that at least some of the additional strength yarns press against the interior of the jacket during the pressure extruding and form grooved impressions on an interior surface of the jacket that remain and are visibly present after the polymeric material has solidified and cooled to room temperature of 25° C., upon opening the jacket to view the interior surface following the pressure extruding step, wherein the steps of stranding the micromodules, positioning the additional strength yarns, and pressure extruding the jacket mitigate lengthwise movement of the optical fibers in the rugged micromodule cable.

2. The method of claim 1, wherein the jacket is robust, having an average thickness of up to 1.25 mm.

3. The method of claim 2, wherein an exterior surface of the jacket defines an exterior of the fiber optic cable and wherein the cable is narrow, having an outer diameter of less than 10 mm.

4. The method of claim 1, wherein the average cross-sectional dimension extending from the exterior of the sheathing to the exterior of the sheathing through the center of the micromodule is less than 1.6 mm.

5. The method of claim 1, wherein the central strength yarns and the additional yarns are both aramid yarns.

6. The method of claim 5, wherein the amount of aramid in the additional yarns is at least three times than of the amount in the central strength yarns.

7. A method of manufacturing a rugged micromodule cable, comprising steps of:
stranding micromodules around one or more central strength yarns, wherein the central strength yarns comprise fibrous strength material, wherein the micromodules each comprise sheathing surrounding a plurality of optical fibers, and wherein the strand profile of the micromodules is tight, having an average lay length of the modules of less than 250 mm;
positioning additional strength yarns around the stranded micromodules; and
pressure extruding a jacket of polymeric material over the additional strength yarns such that at least some of the additional strength yarns press against the interior of the jacket during the pressure extruding and form grooved impressions on an interior surface of the jacket that remain and are visibly present after the polymeric material has solidified and cooled to room temperature of 25° C., upon opening the jacket to view the interior surface following the pressure extruding step,
wherein the steps of stranding the micromodules, positioning the additional strength yarns, and pressure extruding the jacket mitigate lengthwise movement of the optical fibers in the rugged micromodule cable.

8. The method of claim 7, wherein an exterior surface of the jacket defines an exterior of the fiber optic cable and wherein the cable is narrow, having an outer diameter of less than 10 mm.

9. The method of claim 8, wherein the average cross-sectional dimension extending from the exterior of the sheathing to the exterior of the sheathing through the center of the micromodule is less than 1.6 mm.

10. The method of claim 9, wherein the jacket is robust, having an average thickness of up to 1.25 mm.

11. The method of claim 10, wherein the central strength yarns and the additional yarns are both aramid yarns.

12. The method of claim 11, wherein the amount of aramid in the additional yarns is at least three times than of the amount in the central strength yarns.

13. A rugged micromodule cable, comprising:
central strength yarns comprising fibrous strength material;
micromodules stranded around the central strength yarns, wherein the micromodules each comprise sheathing surrounding a plurality of optical fibers, wherein the strand profile of the micromodules is tight, having an average lay length of the modules of less than 250 mm, and wherein the sheathing is thin-walled, having an average thickness of less than about 200 micrometers;
additional strength yarns positioned around the stranded micromodules; and
a jacket of polymeric material surrounding the additional strength yarns, wherein the jacket has grooved impressions on an interior surface of the jacket when the polymeric material is at room temperature of 25° C., which are visibly present upon opening the jacket to view the interior surface,
wherein the strand of the micromodules, the positioning of the additional strength yarns, and the interface between the additional strength yarns and the jacket mitigate lengthwise movement of the optical fibers in the rugged micromodule cable.

14. The cable of claim 13, wherein the central strength yarns and the additional yarns are both aramid yarns.

15. The cable of claim 14, wherein the amount of aramid in the additional yarns is at least three times than of the amount in the central strength yarns.

16. The cable of claim 14, wherein the central strength yarns comprise at least two discrete yarns of aramid.

17. The cable of claim 13, wherein the jacket is robust, having an average thickness of up to 1.25 mm.

18. The cable of claim 13, wherein an exterior surface of the jacket defines an exterior of the fiber optic cable and wherein the cable is narrow, having an outer diameter of less than 10 mm.

19. The cable of claim 13, wherein the average cross-sectional dimension extending from the exterior of the sheathing to the exterior of the sheathing through the center of the micromodule is less than 1.6 mm.

20. The cable of claim 13, wherein at least one of the micromodules comprises twelve optical fibers and another of the micromodules has less than twelve fibers.

* * * * *